United States Patent [19]

Zwiers et al.

[11] Patent Number: 4,957,663
[45] Date of Patent: Sep. 18, 1990

[54] METHOD OF MANUFACTURING OPTICAL COMPONENTS

[75] Inventors: Renso J. M. Zwiers; Johannes M. G. Verhoeven; Herman M. A. Amendt, all of Eindhoven, Netherlands

[73] Assignee: U.S. Philips Corp., New York, N.Y.

[21] Appl. No.: 318,508

[22] Filed: Mar. 2, 1989

Related U.S. Application Data

[63] Continuation of Ser. No. 13,320, Feb. 11, 1987, abandoned.

[30] Foreign Application Priority Data

Feb. 13, 1986 [NL] Netherlands .......................... 8600354

[51] Int. Cl.$^5$ ...................... B29C 33/40; B29C 39/10; B29D 11/00
[52] U.S. Cl. ........................................ 264/1.4; 264/1.7; 264/2.3; 264/2.5; 264/22; 264/225; 264/338
[58] Field of Search .................... 264/1.7, 2.5, 1.4, 2.3, 264/22, 225, 338

[56] References Cited

U.S. PATENT DOCUMENTS

| | | | |
|---|---|---|---|
| 4,432,832 | 2/1984 | Fantone | 264/1.7 |
| 4,566,930 | 1/1986 | Uehara | 264/1.7 |
| 4,657,354 | 4/1987 | Kobayashi | 264/1.7 |

Primary Examiner—James Lowe
Attorney, Agent, or Firm—Ernestine C. Bartlett

[57] ABSTRACT

A method of manufacturing components such as optical components (17, 18, 21, FIG. 2C) by means of a matrix which comprises a preform 12 of glass or quartz and has a skin 14 of a cured epoxy synthetic resin, the surface of which is the negative of a metal mold from which the matrix is produced. The matrix is suitable for use in the above-mentioned method, whereby optical components are produced which have surfaces that are for example, the aspherical negatives of the matrix surface.

11 Claims, 1 Drawing Sheet ical components and preferably optical components which comprise a supporting member of glass or a synthetic resin whose surface is provided at least partly with a synthetic coating layer having an accurately defined surface, in which a curable liquid monomer composition is provided between an accurately defined surface of a matrix and a surface of the supporting member, the composition is cured and the supporting member together with the cured synthetic resin layer bonded thereto is removed from the matrix.

METHOD OF MANUFACTURING OPTICAL COMPONENTS

This is a continuation of application Ser. No. 013,320, filed Feb. 11, 1987 now abandoned.

FIELD OF THE INVENTION

The invention relates to a method of manufacturing components and preferably optical components which comprise a supporting member of glass or a synthetic resin whose surface is provided at least partly with a synthetic coating layer having an accurately defined surface, in which a curable liquid monomer composition is provided between an accurately defined surface of a matrix and a surface of the supporting member, the composition is cured and the supporting member together with the cured synthetic resin layer bonded thereto is removed from the matrix.

BACKGROUND OF THE INVENTION

The above-described method sometimes referred to as a replica process, is notably suitable for the manufacture of high quality optical components such as lenses and mirrors. It concerns components having a complicated refractive surface, for example, an aspheric surface.

The matrix used in the method is usually manufactured from quartz as is described, for example, in Netherlands Patent Application No. 8301482 and the corresponding U.S. Pat. No. 4,534,929; Netherlands Patent Application No. 8400868 and the corresponding U.S. Ser. No. 618,799 filed Jun. 8, 1984 now U.S. Pat. No. 4,756,972; and British Patent Specification 1,301,551.

The curable monomer composition used in the method may be a thermal hardening resin as is mentioned in the above-mentioned British Patent Specification. A light-curable, for example UV light-curable, monomer composition is preferably used, for example, a mixture of acrylates and a photoinitiator. Such a monomer composition is mentioned in the above Netherlands Patent Applications both in the name of the inventions of the present invention.

A matrix of glass or quartz presents the advantage of a good non-deformability, great hardness and a very strong resistance to chemical attack, such as for example, oxidation. An advantage which is very important for practical purposes is that the monomer composition is exposed via the transparent matrix and can be cross-linked (cured). The use of a stainless steel matrix as described in the U.S. Pat. No. 4,432,832 does not have this important advantage. Moreover, a stainless steel matrix is by far less resistant to chemical attack.

A disadvantage of the use of a matrix of glass or quartz is that it has not proved possible to grind the glass or quartz surface to the desired accuracy in a reproducible manner. All the matrices used in a mass production process mutually have slightly different refractive surfaces. This means that the components manufactured by means of such matrices do not have a uniform reproducible quality.

It is the object of the invention to provide a method in which the manufactured components have the same uniform reproducible quality. Another object is to use in the method matrices which can be produced in large numbers, rapidly, cheaply and especially with great uniform accuracy.

SUMMARY OF THE INVENTION

These and other objects are achieved by means of manufacturing a method of components wherein a matrix is used which has a layered structure in which the matrix has a preform of glass or quartz which at the area where it contacts the above-mentioned monomer composition comprises a skin of a cured epoxy synthetic resin whose surface is accurately defined and is the negative of the desired surface of the manufactured component.

The cured epoxy synthetic resin is obtained by heating or exposing, for example, to UV light, an epoxy resin to which a catalyst or photoinitiator has been added. Light-curable or heat-curable epoxy resins are sufficiently known from literature and are commercially available. The term epoxy resin is to be understood to be a monomer, dimer, oligomer or polymer with one or more functional epoxy groups. These resins are obtained, for example, by causing bisphenols, for example 4, 4'-isopropylidenediphenol (bisphenol-A) or phenolformaldehyde resins of low molecular weight (Novolak resins) to react with epichlorohydrin. The light curable epoxy resins comprise a photoinitiator. A suitable photo initiator is an aromatic halonium salt, for example, diphenylidonium hexafluoroarsenate. For UV light-curable epoxy resins reference is made to the published Netherlands Patent Application No. 7909257 which corresponds to U.S. Patent No. 4,336,740.

In a preferred embodiment of the method according to the invention a matrix is used whose preform manufactured from glass or quartz has a refractive surface which is concave spherical and has a layer of a cross-linked epoxy synthetic resin in which the surface of the layer epoxy synthetic resin remote from the preform refractive surface is concave aspherical.

The invention also relates to a matrix which is suitable for use in the above-described method and which is characterized in that the matrix has a layered structure, a preform of glass or quartz having a refractive surface and a layer of a cross-linked epoxy synthetic resin provided on said refractive surface, the surface of the layer of the epoxy synthetic resin remote from the preform refractive surface having an optically accurately defined shape.

In another preferred embodiment of the matrix according to the invention, the preform of glass or quartz has a concave spherical surface which has a layer of a cross-linked epoxy synthetic resin, the surface of the layer of the epoxy synthetic resin remote from the preform being concave aspheric.

In a further preferred embodiment of the matrix, the layer of cured epoxy synthetic resin comprises a thin layer of $SiO_2$ which optionally comprises a mold release agent. A suitable mold release agent is a silver mercaptan, such as, for example, an Ag-alkylmercaptan, for example Ag-hexadecylmercaptan.

A great many components can be manufactured according to the above-described replica process in particular by means of a matrix having a supporting member of quartz which at the refractive surface has a layer of a cured epoxy synthetic resin and thereon a layer of $SiO_2$ and a mold release agent. Interaction between the curable monomer composition, for example, a composition of UV light-curable acrylate on the one hand and the combined layers of cured epoxy synthetic resin and $SiO_2$ on the other hand does not take place.

The invention furthermore relates to a method of manufacturing the above-described matrix. The method according to the invention is characterized in that an accurately defined surface of a metal mold is provided against a refractive surface of a preform of glass or quartz in which a layer of a liquid, light- or heat-cross-linkable epoxy resin is provided between the two said surfaces, the layer of the liquid epoxy resin is cross-linked and the preform with the layer of the cross-linked epoxy synthetic resin bonded thereto whose surface is the negative of that of the mold is removed.

The metal mold is preferably manufactured from aluminum, copper or brass. These metals can very readily be machined with high precision. By means of a precision machining operation, such as turning, the metal mold can be provided with a very accurately defined surface, in particular an aspherical surface. From such a mold many matrices can be manufactured according to the above method in which each matrix has a fully identical reproducible surface which is the exact negative of the surface of the metal mold. In comparison with the known process of manufacturing quartz matrices in which the quartz surface is machined by a cumbersome grinding and polishing process to the desired accurate shape, the process according to the invention has the advantage that the resulting matrices have a more accurate and in particular a more uniform surface. Another important advantage is that the matrices can be manufactured considerably more rapidly and cheaply by a great saving of processing time.

The metal mold, for example a copper mold, may be provided with a mold release layer and the refractive surface of the preform of glass or quartz may be provided with a bonding layer. A suitable mold release layer is, for example, a layer of an alkylmercaptan. An example of a bonding layer for an epoxy synthetic resin is a layer of a γ-glycidoxypropyl trimethoxysilane. This bonding layer is cured together with the liquid epoxy resin and is cross-linked to the epoxy resin.

BRIEF DESCRIPTION OF THE DRAWINGS

The invention will be described in greater detail with reference to the drawing, in which FIG. 1 A to C are diagrammatic cross-sectional views of a method of manufacturing a matrix, and FIGS. 2 A to C and 3 are diagrammatic cross-sectional views of a method of manufacturing components by means of the matrix obtained by using the method shown in FIGS. A–C.

DESCRIPTION OF THE PREFERRED EMBODIMENTS

Figure 1A:
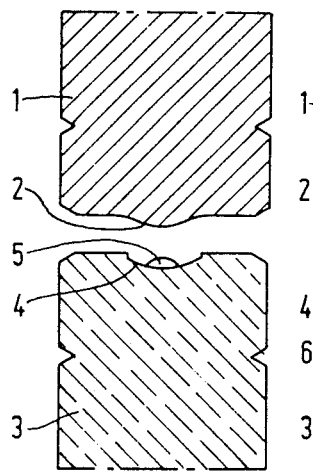

Reference numeral 1 in FIG. 1 denotes a mold manufactured from aluminum and having an aspheric surface 2 which is very accurately profiled by means of a mechanical precision working process, in particular by means of turning. The aspherical surface 2 has a mold release layer not shown. Reference numeral 3 denotes a preform of quartz. This preform has a pre-processed refractive surface 4 which has a concave spherical shape. Refractive surface 4 of preform 3 comprises a bonding layer not shown. A small quantity of UV light-curable epoxy resin 5 is provided on the refractive surface 4 and has the following composition:

95 % by weight of diglycidyl ether of bisphenol A (available commercially under the tradename DOW 332)

4.75 % by weight of diphenyliodonium hexafluoroarsenate (photo initiator)

0.25 % by weight of anthracent (sensitizer).

Figure 1B:
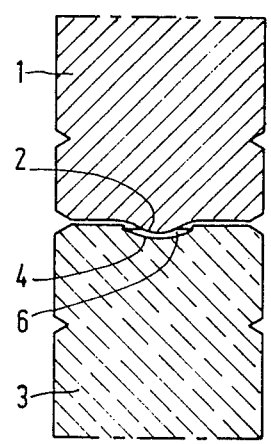
Figure 1C:
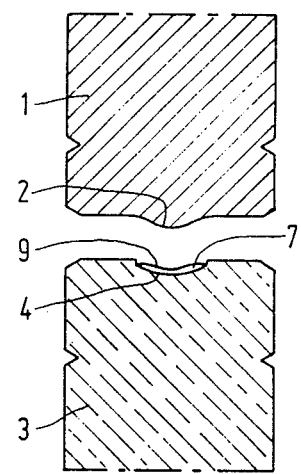

Mold 1 is positioned accurately relative to preform 3, for example, by means of a V-block construction. Mold 1 with aspherical surface 2 is moved towards the spherical surface 4 of preform 3. The final position is shown in FIG. 1B. The liquid epoxy resin has spread between the surfaces 2 and 4, a resin layer 6 being formed. Said resin layer is exposed to UV light via the transparent preform 3 and is cured. The mold 1 is then severed from the preform 3. This situation is shown in FIG. 1C. The cured epoxy layer 7 is bonded to preform 3 and together with preform 3 constitutes the matrix 8. The surface 9 of the cured epoxy layer 7 remote from preform 3 is the negative of the aspherical surface 2 of mold 1. During curing of the epoxy resin some shrinkage will occur. In the manufacture of the aspherical surface 2 of mold 1 this shrinkage has been taken into account. So the surface 2 has been corrected for such a shrinkage. It is also possible, after severing mold 1 and matrix 8, to repeat the above-described procedure by means of a smaller quantity of the curable epoxy resin so that a multiple layer of cured epoxy is provided on preform 3 and herewith the shrinkage deviation is restricted to a very low level. Finally, a layer of $SiO_2$ in a thickness of, for example, 100 nm is vapor-deposited or sputtered on epoxy layer 9 of matrix 8 and a mold release layer of, for example, Ag-hexadecylmercaptan is provided thereon. In the above-described manner a great many fully identical matrices can be manufactured rapidly, cheaply and with great accuracy by means of one mold. The matrices thus manufactured are used in the manufacture of, for example, an optical component as is shown in FIG. 2.

Figures 2A, 2B, 2C:
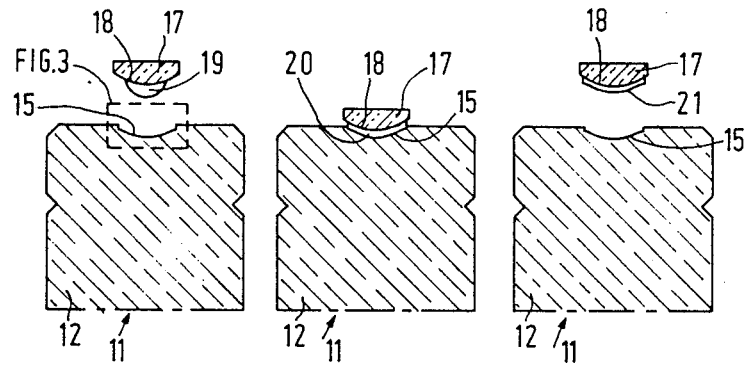
Figure 3:
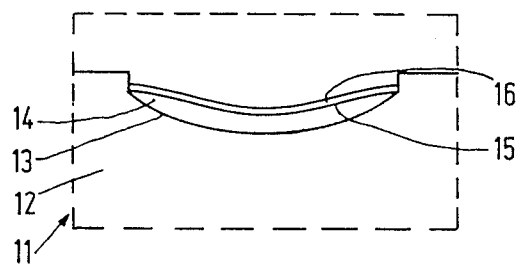

Reference numeral 11 in FIG. 2A and FIG. 3 denotes a matrix which comprises a preform 12 of quartz. Preform 12 has a concave spherical surface 13 which is covered by a layer 14 of cured synthetic resin (see FIG. 3). Layer 14 has an optically accurate aspherical surface 15 which is coated by a layer 16 of vapor-deposited or sputtered $SiO_2$. A mold release layer of Ag mercaptan, not shown, is provided on layer 16. Reference numeral 17 denotes a quartz supporting member having a spherical convex refractive surface 18 which is provided with a bonding agent γ-methacryloxypropyl trichlorosilane not shown. A small quantity of a UV light curable liquid lacquer 19 is provided on surface 18 in the following composition:

96 % by weight of ethoxylated bisphenol-A dimethacrylate (available commercially under the trade name Diacryl)

4 % by weight of α, α'-dimethoxyphenylacetophenone (photo-initiator, tradename Irgacure)

Supporting member 17 with lacquer deposit 19 is pressed against the aspherical surface 15 of matrix 11, lacquer deposit 19 spreading between surfaces 15 and 18. Herewith the situation shown in FIG. 2B is reached. The lacquer has spread, a lacquer layer 20 being formed. The lacquer layer 20 is exposed to UV light and the supporting member 17 is then removed from the matrix 11. This situation is shown in FIG. 2C. The supporting member 17 comprises at its surface 18 a layer of cured lacquer the surface 21 of which is aspherical and is the negative of the aspherical surface of matrix 11.

What is claimed is:

1. A method of manufacturing components which comprise a supporting member of glass or a synthetic resin whose surface is provided at least partly with a synthetic resin coating layer having an accurately defined surface, in which a curable liquid monomer composition is provided between an accurately defined surface of a matrix and a surface of the supporting member, the composition is cured and the supporting member together with the cured synthetic resin layer bonded thereto is removed from the matrix, wherein a matrix is used which is the product of a method comprising the steps of interposing a layer of a curable epoxy resin between an accurately defined surface of a mold and the refractive surface of a preform, contacting said surfaces while curing said epoxy resin to a hardened state and removing a matrix from the mold, the matrix having a layered structure and comprising a preform of glass or quartz which at the area where it contacts the curable monomer composition has a skin of cured epoxy synthetic resin the surface of which is accurately defined and is the negative of the accurately defined surface of the mold from which the matrix was produced and wherein the surface of the manufactured component is the replica of the mold from which the matrix was produced.

2. A method as claimed in claim 1, wherein a matrix is used which comprises a glass or quartz preform having a refractive surface which is concave spherical and has a layer of a cross-linked epoxy resin in which the surface of the layer of epoxy synthetic resin remote from the preform is concave aspherical.

3. A method of manufacturing optical components which comprises the steps of:
(1) providing a mold having an accurately defined surface;
(2) providing a glass or quartz preform having a refractive surface;
(3) interposing a layer of a curable epoxy resin between the said mold surface and the said preform surface;
(4) pressing said surfaces together while curing said epoxy resin;
(5) separating said mold and a matrix, said matrix comprising a layer of cured epoxy resin bonded to the glass or quartz preform, the surface of said resin that is remote from said preform being the negative of the mold surface;
(6) providing a quartz or glass supporting member having an accurately defined surface;
(7) interposing a layer of curable monomer composition between the matrix separated in step (5) and said supporting member;
(8) pressing said surfaces together while curing said resin; and
(9) separating said matrix and supporting member, said supporting member comprising at its surface a layer of cured resin the surface of which is the negative of the surface of the matrix and the replica of the surface of the mold.

4. A method as claimed in claim 3 wherein the mold has an aspherical surface.

5. A method as claimed in claim 4 wherein said epoxy resin is cross-linked by exposure to U.V.-light through the transparent preform.

6. A method as claimed in claim 4 wherein the surface of the cured epoxy resin remote from said preform is the negative of the aspherical surface of the mold.

7. A method as claimed in claim 6 wherein said epoxy resin has a layer of $SiO_2$ applied thereto.

8. A method as claimed in claim 7 wherein said layer of $SiO_2$ contains a mold release agent.

9. A method as claimed in claim 7 wherein said monomer composition between said matrix and said supporting member surfaces is a mixture of acrylate monomers containing a photoinitiator.

10. A method as claimed in claim 7 wherein said supporting member separated from said matrix in step (9) comprises a layer of cured resin the surface of which is aspherical and the negative of the aspherical surface of the matrix.

11. A method of manufacturing optical components which comprises the steps of:
(1) providing a precisely turned metal mold having an accurately defined aspherical surface;
(2) providing a glass or quartz preform having a spherical refractive surface;
(3) interposing a layer of a curable epoxy resin between the said metal mold surface and the said preform surface;
(4) pressing said surfaces together while curing said epoxy resin by exposure to ultraviolet light through the transparent preform;
(5) separating said metal mold and a matrix, said matrix comprising a layer of cured epoxy resin bonded to the glass or quartz preform, the surface of said resin that is remote from said preform being the negative of the aspherical metal mold surface;
(6) providing a quartz or glass supporting member having a spherical convex refractive surface and a ultraviolet light curable acrylate resin on the surface remote from the refractive surface;
(7) pressing said resin bearing surface and said matrix aspherical surface together while curing said curable resin by exposure to ultraviolet light; and
(8) separating said matrix and supporting member, said supporting member comprising at its surface a layer of cured resin the surface of which is the negative of the surface of the matrix and the replica of the precisely turned metal mold surface.

* * * * *